Patented June 19, 1934

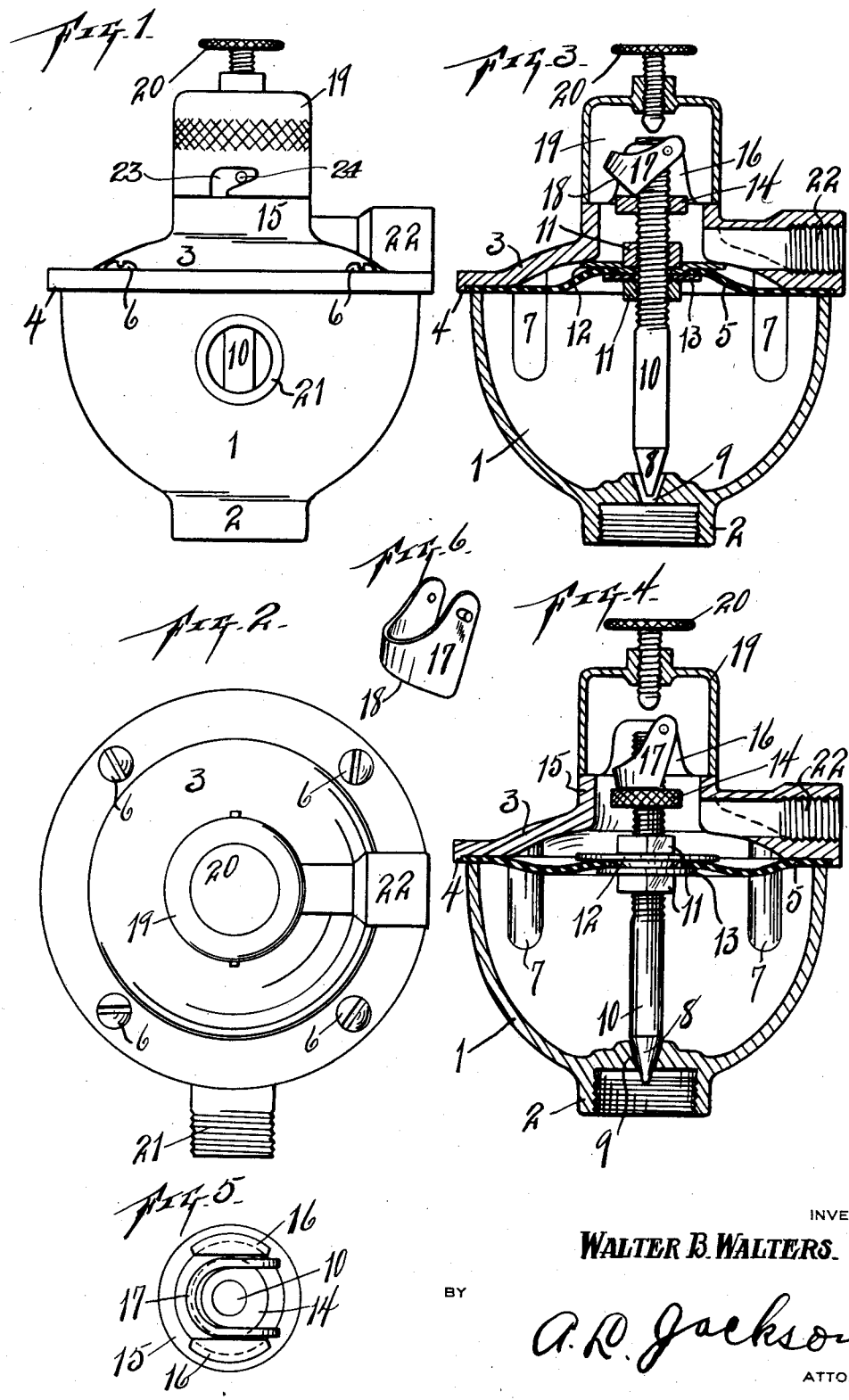

1,963,452

UNITED STATES PATENT OFFICE 1,963,452

AUTOMATIC GAS CUT-OFF

Walter B. Walters, San Antonio, Tex.

Application June 15, 1931, Serial No. 544,509

5 Claims. (Cl. 137—153)

My invention relates to automatic gas cut-offs; and the object is to provide certain safety devices for protection against accidental escape of gas in bed-rooms and other places in residences and other buildings and to provide safety devices which are simple in construction and operation and which can be furnished at small cost. Another advantage is an automatic locking device. Other objects and advantages will be fully explained in the following description, and the invention will be more particularly pointed out in the claims.

Reference is had to the accompanying drawing which forms a part of this application.

Fig. 1 is a side elevation of the valve assembled.

Fig. 2 is a plan view of the same.

Fig. 3 is a vertical section of the same, showing the operative position.

Fig. 4 is a vertical section, showing the valve closed.

Fig. 5 is a plan view of the locking device.

Fig. 6 is a perspective view of the locking device.

Similar characters of reference are used to indicate the same parts throughout the several views.

This valve is provided with a casing 1 provided with a connection 2 for connecting with a supply pipe. A cap 3 is provided, and this cap has an annular depending flange 4. A flexible diaphragm 5 is caught between the casing 1 and the cap 3 and is surrounded by the flange 4. The cap 3 is secured in place and pressed down on the edge of the diaphragm 5 by screw 6 which project down in the enlargements 7 in the casing 1. The gas inlet 9 is opened and closed by a valve 8 which is of the needle type. The valve stem 10 is threaded and fixedly connected to the diaphragm 5 by nuts 11. As a protection for the diaphragm, plates 12 and 13 are placed above and below the diaphragm 5 and clamped thereon by nuts 11. It is apparent that the nuts 11 and the plates 12 and 13 are adjustable on the threaded stem 10 and serve to limit the upward thrust of the stem 10, making the diaphragm 5 approximately as strong as the cap. This will serve as a protection also for the diaphragm.

The cap 3 has an upper extension 15 and lugs 16 project upwardly from the inner edge of this extension as shown in Fig. 5. A lock 17, illustrated in detail in Figure 6, is pivotally connected to the lugs 16 and swings freely thereon. The lock 17 is eccentrically mounted, that is, off-center, so that the lock will fall by gravity automatically whenever the stem 10 drops, carrying the seat 14. The lower end 18 of the lock is adapted to engage the stop nut 14 for holding the valve 8 closed. Fig. 3 shows the valve 8 open and the lock 17 in inoperative position, and Fig. 4 shows the valve 8 closed and locked closed by the lock 17. By reason of the threads on the stem 10, the stop nut 14 is adjustable on the stem to form a stop or seat for the lock 17 so that the stem cannot be raised by gas pressure on the valve 8. A cap 19 is used to cover the locking devices and the lock 17 being eccentrically mounted, will prevent the placing of the cap 19 when the lock is swung back on the opposite side of its position as shown in Figs. 3 and 4. A thumb screw 20 is used to limit the upward movement of the stem 10. The screw 20 is pointed and the upper end of the stem 10 is concave and the screw serves also to hold the stem in perfect alignment. If some irresponsible person should turn the screw 20 enough to cut off the gas, the lock 17 would fall to the position shown in Fig. 4. The party might turn the screw 20 in the opposite direction, but no gas could enter the casing on account of the automatic locking of the valve 8.

The cap 19 is placed on the extension 15 and secured thereon by the slots 23 in the cap and by the lugs 24 which are rigid with the lugs 16.

The valve has a connection 21 for a service pipe. The valve has also a discharge opening 22 for any gas that may penetrate the diaphragm 5 into the space above the diaphragm to let gas escape to the atmosphere.

In operation, as long as there is gas pressure in the casing, the diaphragm 5 will hold the valve 8 open and the lock will be in the position shown in Fig. 3. The supply comes in through the opening 9 and is served through the discharge opening 21. If the gas pressure becomes very weak or there ceases to be any gas pressure in the casing 1, the valve 8 will drop automatically down and close the opening 9 and the lock 17 will then occupy the position shown in Fig. 4. The same thing will take place if the gas is cut off or the hose or pipe between the valve and the stove or heater or other appliance becomes disconnected. This will prevent the escape of gas should the gas pressure rise again. No gas can enter the casing 1, as long as the lock 17 is in the position shown in Fig. 4.

The construction and arrangement of the locking devices are of such design that it will be difficult for an unauthorized person to manipulate the locking devices, because the eccentric top portion of the lock 17 must be rolled with one finger, and to lift the valve 8 at the same time. The upper part of the lock 17 is to the rear of the lugs 16 and the lock 17 must be manually actuated to bring the same to unlocked position after the cap 19 is removed. The cap 19 is placed on the extension 15 and secured thereon by the slots 23 in the cap and by the lugs 24 which are rigid with the lugs 16.

What I claim, is,—

1. A gas cut-off comprising a casing provided with inlet and discharge openings, a flexible diaphragm disposed substantially horizontally in said casing, a valve for closing said inlet opening provided with a stem fixedly connected to and passing through said diaphragm, a locking device pivotally mounted in said casing, a nut adjustably mounted on said stem and forming a base for supporting said locking device both in the locked position and the unlocked position, said locking device being adapted for automatically locking said valve closed, and means for inclosing said locking devices and the upper part of the said valve stem.

2. A gas cut-off comprising a casing provided with inlet and discharge openings, a flexible diaphragm horizontally disposed in said casing, upstanding lugs rigid with said casing, a yoke locking device pivotally connected to said lugs and provided with a locking base, a valve for closing said inlet opening provided with a stem projecting through said diaphragm and fixedly connected thereto and projecting through said locking device, and a nut adjustably mounted on said stem and adapted to support said locking device either in the locked position or the unlocked position.

3. A gas cut-off comprising a casing provided with inlet and discharge openings, a flexible diaphragm horizontally disposed in said casing, upstanding lugs rigid with said casing, a yoke locking device pivotally connected to said lugs and provided with a locking base, a valve for closing said inlet opening provided with a stem projecting through said diaphragm and fixedly connected thereto and movable by said diaphragm and projecting through said locking device, a nut adjustably mounted on said stem and adapted to support said locking device either in the locked or unlocked position, a cap for inclosing said locking devices, and means associated with said cap for fixedly limiting the upward thrust of said valve stem.

4. A gas cut-off comprising a casing provided with inlet and discharge openings, a flexible diaphragm horizontally disposed in said casing, upstanding lugs rigid with said casing, a yoke locking device pivotally and eccentrically connected to said lugs, a valve for opening and closing said inlet opening provided with a stem having a portion thereof threaded and projected through said diaphragm, means for fixedly connecting said diaphragm to said stem including a plate adapted to bear against said casing for protecting the diaphragm, and a stop adjustably mounted on said stem for supporting said locking device.

5. A gas cut-off comprising a casing having an inlet and an outlet for gas a gravity-actuated valve provided with a yielding stem, gas controlled means holding said valve normally open, a stop on said stem, lugs rigid with said casing on opposite sides of said stem, and a locking yoke astride said stem and eccentrically pivoted on said lugs with the upper end of the yoke substantially of the same height as said lugs and said locking device supported on said stop in the open position of the valve and adapted to engage said stop to hold said valve in position to close said inlet.

WALTER B. WALTERS.